United States Patent
Ishihama et al.

(10) Patent No.: US 6,943,227 B2
(45) Date of Patent: Sep. 13, 2005

(54) CATALYST FOR OLEFIN POLYMERIZATION AND METHOD OF POLYMERIZATION OF OLEFIN

(75) Inventors: Yoshiyuki Ishihama, Mie (JP); Toshihiko Sugano, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 0 days.

(21) Appl. No.: 10/480,650

(22) PCT Filed: Jun. 26, 2002

(86) PCT No.: PCT/JP02/06410

§ 371 (c)(1),
(2), (4) Date: Dec. 29, 2003

(87) PCT Pub. No.: WO03/002616

PCT Pub. Date: Jan. 9, 2003

(65) Prior Publication Data

US 2004/0176242 A1 Sep. 9, 2004

(30) Foreign Application Priority Data

Jun. 29, 2001 (JP) ........................................ 2001-198041

(51) Int. Cl.⁷ .................................................. C08F 4/42
(52) U.S. Cl. ........................ 526/160; 526/943; 526/348; 502/152; 502/103
(58) Field of Search ................................ 526/160, 943, 526/348; 502/152, 103

(56) References Cited

FOREIGN PATENT DOCUMENTS

| EP | 310734 | 4/1989 |
|----|--------|--------|
| EP | 511665 | 11/1992 |
| EP | 598628 | 5/1994 |
| JP | 10-45819 | 2/1998 |
| JP | 11-292912 | * 10/1999 |
| JP | 2001-192405 | 7/2001 |
| WO | 00/04056 | 1/2000 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

The present invention provides a catalyst for olefin polymerization having high olefin polymerization activity without being accompanied by generation of an adhered polymer on the wall of a polymerization reactor and the wall of pipe line and generation of a locking massive polymer, and capable of manufacturing an olefin polymer industrially and stably for a long period of time. That is, the present invention related to a catalyst for olefin polymerization comprising [A1] a hafnium compound or a zirconium compound having at least one conjugated 5-membered ring ligand, [A2] a zirconium compound having at least one conjugated 5-membered ring ligand but different from [A1], and [B] phyllosilicate, and relates to a method of polymerizing or copolymerizing olefin in the presence of the catalyst.

12 Claims, No Drawings

CATALYST FOR OLEFIN POLYMERIZATION AND METHOD OF POLYMERIZATION OF OLEFIN

TECHNICAL FIELD

The present invention relates to a catalyst for olefin polymerization and a method of polymerization of olefin. More specifically, the present invention relates to a catalyst for olefin polymerization having specific high polymerization activity, and a method of olefin polymerization capable of continuous running on an industrial scale for a long period of time with the catalyst.

BACKGROUND ART

In manufacturing an olefin polymer by polymerizing olefin, methods of using catalysts comprising (1) a metallocene compound, and (2) phyllosilicate are proposed (JP-A-5-301917 and JP-A-8-127613 (the term "JP-A" as used herein means an "unexamined published Japanese patent application").

The polymerization methods of using these catalysts are high in polymerization activity not only per transition metals and Al but also per solid components as compared with conventional methods of using methylalumoxane carried by carriers such as inorganic oxides, e.g., silica or alumina, or organic substances (JP-A-60-35007, JP-A-61-31404, JP-A-61-108610, JP-A-61-276805 and JP-A-61-296008). There is also a trial to improve the flowability of catalyst particles and product polymer particles by making phyllosilicate, which is a cocatalyst, spherical by spray granulation (JP-A-7-228621).

However, when olefin is polymerized with these catalysts, since polymerization activity is not yet sufficient and the reactivity of initial stage polymerization is low (so-called initial activity), fine particles liable to generate agglomeration and adhesion in a polymerization reactor, i.e., particles low in activity, increase, which hinder stable running of polymerization, or low-melting point particles are formed from the unevenness of every composition of particles, followed by the increase of agglomeration and adhesion, and adhered polymer and massive polymer are formed on the wall of a polymerization reactor, the wall of product-discharging pipe line, and the pipe line for circulating polymerization gas. Therefore, industrial running of polymerization for a long period of time was difficult.

The present invention has been done in view of the above problems. Therefore, the objects of the present invention are to provide a catalyst for olefin polymerization without being accompanied by generation of an adhered polymer on the wall of a polymerization reactor and the wall of pipe line, and generation of a blocking massive polymer while maintaining high olefin polymerization activity, and capable of manufacturing an olefin polymer industrially and stably for a long period of time, and to provide a method of polymerization of olefin.

DISCLOSURE OF THE INVENTION

To solve the above problems, the present inventors have found that when a catalyst having high polymerization activity and an appropriately high initial activity is invented and polymerization of olefin is carried out with the catalyst, it is possible to rapidly enlarge particle sizes in a polymerization reactor and prevent the trouble due to fine particle generation, such as agglomeration and adhesion, and the manufacture of olefin polymer particles excellent in flowability becomes possible.

Since the particle sizes of the catalyst particles just after being put in a polymerization reactor are small as compared with the particle sizes of other polymer particles, adhesion of the particles to the wall of the reactor, agglomeration of particles to each other, and scattering from the reactor are liable to occur, thus stable running of polymerization is easily hindered. In the present invention, for preventing such hindrance, polymerization of the catalyst put in a reactor rapidly progresses to enlarge the particle sizes.

Therefore, by making a specific metallocene component [A1 described later] and a component [A2] coexist with a cocatalyst phyllosilicate on the same catalyst, the improvement of the efficiency of activity which cannot be achieved by each component alone can be achieved for the first time by the synergistic effect of two components in the present invention, thus the present invention has been attained.

That is, the present invention can be achieved by the following (1) to (14).

(1) A method of polymerization of olefin which comprises polymerizing or copolymerizing olefin in the presence of a catalyst for olefin polymerization containing [A1] a hafnium compound or a zirconium compound having at least one conjugated 5-membered ring ligand, [A2] a zirconium compound having at least one conjugated 5-membered ring ligand but different from [A1], and [B] phyllosilicate.

(2) The method of polymerization of olefin as described in the above item (1), wherein the [A1] is a hafnium compound.

(3) The method of polymerization of olefin as described in the above item (1) or (2), wherein the [A1] is a metallocene compound represented by the following formula [1]:

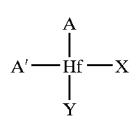

[1]

(in the formula, A and A', which may be the same or different, each represents a ligand having a conjugated 5-membered ring structure, and X and Y, which may be the same or different, each represents a hydrogen atom, a halogen atom, a hydrocarbon group, an alkoxyl group, an amino group, a phosphorus-containing hydrocarbon group or a silicon-containing hydrocarbon group, which are bonded to Hf).

(4) The method of polymerization of olefin as described in the above item (1), wherein the [A1] is a metallocene compound represented by the following formula [2]:

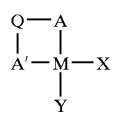

[2]

(in the formula, A and A', which may be the same or different, each represents a ligand having a conjugated 5-membered ring structure, Q represents a linking group crosslinking two conjugated 5-membered ring ligands at arbitrary positions, M represents an Hf atom or a Zr atom, and X and Y, which may be the same or different, each represents a hydrogen atom, a halogen atom, a hydrocarbon group, an alkoxyl group, an amino group, a phosphorus-containing hydrocarbon group, or a silicon-containing hydrocarbon group, which are bonded to M).

(5) The method of polymerization of olefin as described in the above item (3) or (4), wherein A and A' in formula [1] or [2] in claim (3) or (4) each represents a cyclopentadienyl group having substituents at the 1-position and/or the 3-position.

(6) The method of polymerization of olefin as described in the above item (1), wherein the [A2] is a metallocene compound represented by the following formula [5]:

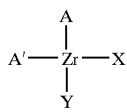

[5]

(in the formula, A and A', which may be the same or different, each represents a ligand having a conjugated 5-membered ring structure, and X and Y, which may be the same or different, each represents a hydrogen atom, a halogen atom, a hydrocarbon group, an alkoxyl group, an amino group, a phosphorus-containing hydrocarbon group, or a silicon-containing hydrocarbon group, which are bonded to Zr).

(7) The method of polymerization of olefin as described in the above item (6), wherein A and A' in formula [5] each represents a cyclopentadienyl group having substituents at the 1-position and/or the 3-position.

(8) The method of polymerization of olefin as described in the above item (1), wherein the [B] phyllosilicate belongs to a smectite group.

(9) The method of polymerization of olefin as described in any of the above items (1) to (8), wherein the catalyst for olefin polymerization is brought into contact with an olefin in advance and the olefin of from 0.01 to 1,000 g per 1 g of the [B] phyllosilicate is preliminarily polymerized.

(10) The method of polymerization of olefin as described in any of the above items (1) to (9), wherein (a) ethylene, and (b) at least one of alpha-olefins having from 3 to 20 carbon atoms as the olefins, are copolymerized.

(11) The method of polymerization of olefin as described in the above item (10), wherein the (b) alpha-olefin includes at least 1-hexene.

(12) The method of polymerization of olefin as described in any of the above items (1) to (11), wherein the olefin is polymerized by gas phase polymerization.

(13) The method of polymerization of olefin as described in any of the above items (1) to (12), wherein the obtained olefin polymer is an ethylene/alpha-olefin copolymer which satisfies density of from 0.890 to 0.930 g/cm$^3$, and MI of from 0.1 to 20 g/10 minutes.

(14) A catalyst for polymerization of olefin comprising [A1] a hafnium compound or a zirconium compound having at least one conjugated 5-membered ring ligand, [A2] a zirconium compound having at least one conjugated 5-membered ring ligand but different from [A1], and [B] phyllosilicate.

BEST MODE FOR CARRYING OUT THE INVENTION

In the specification of the present invention:

(1) There are cases where "a hafnium compound or a zirconium compound having at least one conjugated 5-membered ring ligand" is referred to as [A1] or component [A1].

(2) There are cases where "a compound which is a zirconium compound having at least one conjugated 5-membered ring ligand but different from [A1]" is referred to as [A2] or component [A2].

(3) There are cases where [A1] and [A2] are inclusively referred to as [A] or component [A].

(4) There are cases where phyllosilicate is referred to as [B] or component [B].

(5) There are cases where an organoaluminum compound is referred to as [C] or component [C].

{[A]}

<[A1] A hafnium compound or a zirconium compound having at least one conjugated 5-membered ring ligand>

Preferred [A1] for use in the present invention is a compound represented by the following formula [1], [2], [3] or [4].

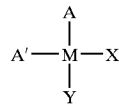

[1]

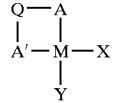

[2]

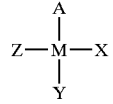

[3]

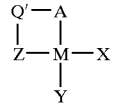

[4]

[In the formulae, A and A', which may be the same or different, each represents a ligand having a conjugated 5-membered ring structure, Q represents a linking group crosslinking two conjugated 5-membered ring ligands at arbitrary positions, M represents an Hf atom or a Zr atom, Z represents a ligand containing a nitrogen atom, an oxygen atom, a silicon atom, a phosphorus atom or a sulfur atom, or a hydrogen atom, a halogen atom, or a hydrocarbon group bonded to M, Q' represents a linking group crosslinking an arbitrary position of the conjugated 5-membered ring ligand and Z, and X and Y, which may be the same or different, each represents a hydrogen atom, a halogen atom, a hydrocarbon group, an alkoxyl group, an amino group, a phosphorus-containing hydrocarbon group, or a silicon-containing hydrocarbon group bonded to M].

The preferred typical example of the conjugated 5-membered ring ligand is a carbon-conjugation 5-membered ring ligand, i.e., a cyclopentadienyl group, and the hydrogen atom of the cyclopentadienyl group may be substituted with a substituent.

As the substituents of the cyclopentadienyl group, a hydrocarbon group having from 1 to 20, preferably from 1 to 12, carbon atoms, a halogen atom (e.g., fluorine, chlorine, bromine), an alkoxyl group (e.g., an alkoxyl group having from 1 to 12 carbon atoms), a silicon-containing hydrocarbon group (e.g., a silicon-containing hydrocarbon group having from about 1 to about 24 carbon atoms containing the silicon atom in the form of —Si(R$^1$)(R$^2$)(R$^3$)), a phosphorus-containing hydrocarbon group (e.g., a phosphorus-containing hydrocarbon group having from about 1 to about 18 carbon atoms containing the phosphorus atom in the form of —P($R^1$) ($R^2$)) a nitrogen-containing hydrocarbon group (e.g., a nitrogen-containing hydrocarbon group having from about 1 to about 18 carbon atoms containing the nitrogen atom in the form of —N($R^1$) ($R^2$)), or a boron-containing hydrocarbon group (e.g., a boron-containing hydrocarbon group having from about 1 to about 18 carbon atoms containing the boron atom in the form of —B($R^1$) ($R^2$)) are preferred.

When the cyclopentadienyl group is substituted with a plurality of substituents, two of these substituents may be respectively bonded at the other terminals (ω-terminals) to form a ring together with a part of the cyclopentadienyl group. Preferably, they may form a condensed 6-membered indenyl ring skeleton with holding the carbon atom of the contiguous substituent in common, they may form a fluorenyl ring having two condensed 6-membered rings bonded to the position of conjugation of a cyclopentadienyl group, and they may form a condensed 7-membered azulenyl ring.

Q represents a linking group crosslinking two conjugated 5-membered ring ligands A and A' at arbitrary positions, and Q' represents a linking group crosslinking an arbitrary position of the conjugated 5-membered ring ligand A and a Z group.

Crosslinkable groups Q and Q' are well known, and they are not particularly limited so long as they are crosslinkable groups. The preferred specific examples of them are as shown below.
(a) an alkylene group having from 1 to 20 carbon atoms, e.g., a methylene group, an ethylene group, an isopropylidene group, a phenylmethylmethylene group, a diphenylmethylene group, a cyclohexylene group, etc.,
(b) a silylene group, e.g., a silylene group, a dimethylsilylene group, a phenylmethylsilylene group, a diphenylsilylene group, a disilylene group, a tetramethyldisilylene group, etc.,
(c) a hydrocarbon group containing germanium, phosphorus, nitrogen, boron or aluminum, specifically, a ($CH_3$)$_2$Ge group, a ($C_6H_5$)$_2$Ge group, a ($CH_3$)P group, a ($C_6H_5$)P group, a ($C_4H_9$)N group, a ($C_6H_5$)N group, a ($CH_3$)B group, a ($C_4H_9$)B group, a ($C_6H_5$)B group, a ($C_6H_5$)Al group, a ($CH_3$O)Al group, etc., are exemplified.

Of these groups, an alkylene group, in particular, an ethylene group, an isopropylidene group and a silylene group are preferred, and a dimethylsilylene group is particularly preferred.

Z represents a ligand containing a nitrogen atom, an oxygen atom, a silicon atom, a phosphorus atom or a sulfur atom, or a hydrogen atom, a halogen atom, or a hydrocarbon group bonded to M. The specific examples of preferred Z include oxygen (—O—), sulfur (—S—), an alkoxyl group having from 1 to 20, preferably from 1 to 10, carbon atoms, a thioalkoxyl group having from 1 to 20, preferably from 1 to 12, carbon atoms, a silicon-containing hydrocarbon group having from 1 to 40, preferably from 1 to 18, carbon atoms, a nitrogen-containing hydrocarbon group having from 1 to 40, preferably from 1 to 18, carbon atoms, a phosphorus-containing hydrocarbon group having from 1 to 40, preferably from 1 to 18, carbon atoms, a hydrogen atom, a chlorine atom, a bromine atom, and a hydrocarbon group having from 1 to 20 carbon atoms. Z more preferably represents a nitrogen-containing hydrocarbon group, and the specific examples include methylamide, ethylamide, n-propylamide, i-propylamide, n-butylamide, i-butylamide, t-butylamide, n-pentylamide, 2-pentylamide, 3-pentylamide, 2-methyl-1-butylamide, 2-methyl-2-butylamide, 3-methyl-1-butylamide, 3-methyl-2-butylamide, 1,2-dimeethyl-1-propylamide, 1,2-dimethyl-2-propylamide, 2,3-dimethyl-1-propylamide, 1,3-dimethyl-1-propylamide, 1,3-dimethyl-2-propylamide, hexylamide, peptylamide, octylamide, 2-propenylamide, isopropenylamide, 1,4-pentadienylamide, cyclopentylamide, cyclohexylamide, 2,4-cyclopentadien-1-ylamide, benzylamide, 4-phenyl-cyclohexylamide, phenylamide, cumenylamide, mesitylamide, tolylamide, xylylamide, naphthylamide and anthrylamide, and the most preferred Z are t-butylamide, phenylamide and cyclohexylamide.

X and Y each represents a hydrogen atom, a halogen atom, a hydrocarbon group having from 1 to 20, preferably from 1 to 10, carbon atoms, an alkoxyl group having from 1 to 20, preferably from 1 to 10, carbon atoms, an amino group, a phosphorus-containing hydrocarbon group having from 1 to 20, preferably from 1 to 12, carbon atoms (specifically, e.g., a diphenylphosphine group), or a silicon-containing hydrocarbon group having from 1 to 20, preferably from 1 to 12, carbon atoms (specifically, e.g., a trimethylsilyl group, a bis(trimethylsilyl)methyl group). X and Y may be the same or different. Of these groups, a halogen atom, especially a chlorine atom, a hydrocarbon group (particularly, a hydrocarbon group having from 1 to 8 carbon atoms, in particular, a methyl group) and an amino group are preferred, and a diethylamino group is particularly preferred.

Accordingly, in the catalyst for olefin polymerization in the present invention, A and A' in formula [1], [2], [3] or [4] each particularly preferably represents cyclopentadienyl, n-butyl-cyclopentadienyl, dimethyl-cyclopentadienyl, diethyl-cyclopentadienyl, ethyl-n-butyl-cyclopentadienyl, ethyl-methyl-cyclopentadienyl, n-butyl-methyl-cyclopentadienyl, indenyl, 2-methyl-indenyl, 2-methyl-4-phenylindenyl, tetrahydroindenyl, 2-methyl-tetrahydroindenyl, 2-methyl-benzindenyl, 4-hydroazulenyl, 2,4-dimethylhexahydroazulenyl, 2-methyl-4-phenyl-4H-azulenyl, or 2-methyl-4-phenyl-hexahydroazulenyl. In these compounds, the preferred positions of substitution are the 1-position and/or the 3-position. X and Y each particularly preferably represents a chlorine atom, a methyl group or a diethylamino group.

In formula [2] or [4], Q and Q' each particularly preferably represents ethylene, dimethylsilylene or isopropylidene, and Z particularly preferably represents t-butylamide, phenylamide or cyclohexylamide.

Preferred component [A1] is comprised of every combination of these specific groups exemplified as A, A', X, Y, Q, Q' and Z.

Further, particularly preferred [A1] is a compound represented by formula [1], wherein A and A' are substituted at two positions or one position with an alkyl group having from 1 to 20 carbon atoms, and in the case where A and A' have substituents at two positions, A and A' represent a cyclopentadienyl group and respectively having substituents at the 1-position and the 3-position, or A and A' represent a cyclopentadienyl group, wherein two substituents may be condensed to each other to form an indenyl ring; or particularly preferred [A1] is a compound represented by formula [2], wherein Q represents an ethylenyl group, and A and A' are substituted at two positions or one position with an alkyl group having from 1 to 20 carbon atoms, and in the case where A and A' have substituents at two positions, A and A' represent a cyclopentadienyl group, where in two substituents may be condensed to each other to form an indenyl ring.

In the present invention, component [A1] can be used as a mixture of two or more compounds in the group of the compounds represented by the same formula and (or) in the compounds represented by different formulae. The specific examples of the preferred compounds in the case where M represents an Hf atom are shown below.

(I) The Compounds Represented by Formula [1]:
(1) bis(cyclopentadienyl)hafnium dichloride,
(2) bis(methylcyclopentadienyl)hafnium dichloride,
(3) bis(dimethylcyclopentadienyl)hafnium dichloride,
(4) bis(trimethylcyclopentadienyl)hafnium dichloride,
(5) bis(tetramethylcyclopentadienyl)hafnium dichloride,
(6) bis(pentamethylcyclopentadienyl)hafnium dichloride,
(7) bis(i-propylcyclopentadienyl)hafnium dichloride,
(8) bis(n-butylcyclopentadienyl)hafnium dichloride,
(9) bis(n-butylcyclopentadienyl)hafnium dimethyl,
(10) bis(n-butyl-methyl-cyclopentadienyl)hafnium dichloride,
(11) (cyclopentadienyl)(ethyl-methyl-cyclopentadienyl) hafnium dichloride,
(12) bis(indenyl)hafnium dichloride,
(13) bis(tetrahydroindenyl)hafnium dichloride,
(14) bis(2-methyltetrahydroindenyl)hafnium dichloride,
(15) bis(fluorenyl)hafnium dichloride,
(16) bis(cyclopentadienyl)hafnium dimethyl,
(17) (cyclopentadienyl)(azulenyl)hafnium dichloride, etc.

(II) The Compounds Represented by Formula [2]:
(1) methylenebis(indenyl)hafnium dichloride,
(2) methylenebis(4,5,6,7-tetrahydroindenyl)hafnium dichloride,
(3) ethylene(2,4-dimethylcyclopentadienyl)(3',5'-dimethylcyclopentadienyl)hafnium dichloride,
(4) isopropylidenebis(indenyl)hafnium dichloride,
(5) isopropylidene(cyclopentadienyl)(fluorenyl)hafnium dichloride,
(6) ethylene(2,5-diethylcyclopentadienyl)(fluorenyl) hafnium dichloride,
(7) dichloro{1,1'-dimethylmethylenebis[2-methyl-4-(4-biphenyl)-4H-azulenyl]}hafnium,
(8) dimethylsilylenebis(4,5,6,7-tetrahydroindenyl)hafnium dichloride,
(9) dimethylsilylenebis(2-methyl-4,5,6,7-tetrahydroindenyl) hafnium dichloride,
(10) dimethylsilylenebis(2-methyl-4,5-benzindenyl) hafnium dichloride,
(11) dimethylsilylenebis(2-methyl-4-phenylindenyl) hafnium dichloride,
(12) dimethylsilylene(cyclopentadienyl)(3,4-dimethylcyclopentadienyl)hafnium dichloride,
(13) dimethylsilylene(cyclopentadienyl)(fluorenyl)hafnium dichloride,
(14) dimethylsilylene(3-tert-butyl-cyclopentadienyl) (fluorenyl)hafnium dichloride,
(15) dimethylsilylene(cyclopentadienyl)(2,7-di-t-butyl-fluorenyl)hafnium dichloride,
(16) dimethylsilylene(cyclopentadienyl) (octahydrofluorenyl)hafnium dichloride,
(17) dimethylsilylenebis[1-(2-methyl-4-phenyl-4H-azulenyl)]hafnium dichloride,
(18) dichloro{1,1'-dimethylsilylenebis[2-methyl-4-(4-chlorophenyl)-4H-azulenyl]}hafnium,
(19) dichloro{1,1'-dimethylsilylenebis[2-methyl-4-(4-biphenyl)-4H-5,6,7,8-tetrahydroazulenyl]}hafnium, etc.

(III) The Compounds Represented by Formula [3]:
(1) pentamethylcyclopentadienyl-bis(phenyl)aminohafnium dichloride,
(2) indenyl-bis(phenyl)amidohafnium dichloride,
(3) pentamethylcyclopentadienyl-bis(trimethylsilyl) aminohafnium dichloride,
(4) cyclopentadienylhafnium trichloride,
(5) pentamethylcyclopentadienylhafnium trichloride,
(6) cyclopentadienylhafnium benzyl trichloride.

(IV) The compounds represented by formula [4]:
(1) dimethylsilylene(tetramethylcyclopentadienyl)-tert-butylamidohafnium dichloride,
(2) dimethylsilylene(indenyl)cyclohexylamidohafnium dichloride.

The compounds shown in the above (I) to (IV), wherein the chlorine is substituted with bromine, iodine, hydride, methyl, phenyl or diethylamide group can also be used.

Further, in the above examples, the two-substitution products of the cyclopentadienyl ring include 1,2- and 1,3-substitution products and the three-substitution products include 1,2,3- and 1,2,4-substitution products.

When an asymmetric carbon atom is generated in these metallocene-based transition metal compounds, it is one of stereoisomers or a mixture of stereoisomers (including racemic compounds), unless otherwise indicated. Two or more components [A1] may be used in combination.

<[A2] A Zirconium Compound Having at Least One Conjugated 5-Membered Ring Ligand but Different from [A1]>

Component [A2] which is used in the present invention is a compound preferably represented by the following formula [5], [6], [7] or [8].

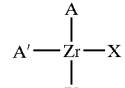

[5]

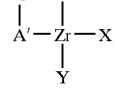

[6]

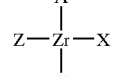

[7]

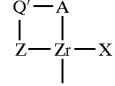

[8]

[In the formulae, A and A', which may be the same or different, each represents a ligand having a conjugated 5-membered ring structure, Q represents a linking group crosslinking two ligands having a conjugated 5-membered ring structure at arbitrary positions, Z represents a ligand containing a nitrogen atom, an oxygen atom, a silicon atom, a phosphorus atom or a sulfur atom, or a hydrogen atom, a halogen atom, or a hydrocarbon group bonded to Zr, Q' represents a linking group crosslinking an arbitrary position of the conjugated 5-membered ring ligand and Z, and X and Y, which may be the same or different, each represents a hydrogen atom, a halogen atom, a hydrocarbon group, an alkoxyl group, an amino group, a phosphorus-containing hydrocarbon group, or a silicon-containing hydrocarbon group bonded to Zr].

The compounds represented by formula [5], [6], [7] or [8] are the compounds obtained by replacing the central transition metal element M in the compounds of formula [1], [2], [3] or [4] representing the above-described component [A1] with zirconium alone. Accordingly, the descriptions on formula [1], [2], [3] or [4] are all applicable to formula [5], [6], [7] or [8].

Of these compounds, the preferred zirconium compound components [A2] are compounds represented by formula [5], [6], [7] or [8], wherein A and A' represent cyclopentadienyl, n-butyl-cyclopentadienyl, dimethyl-cyclopentadienyl, diethyl-cyclopentadienyl, ethyl-n-butyl-cyclopentadienyl, ethyl-methyl-cyclopentadienyl, n-butyl-methyl-cyclopentadienyl, indenyl, 2-methyl-indenyl, 2-methyl-4-phenylindenyl, tetrahydroindenyl, 2-methyl-tetrahydroindenyl, 2-methyl-benzindenyl, 4-hydroazulenyl, 2,4-dimethylhexahydroazulenyl, 2-methyl-4-phenyl-4H-azulenyl, or 2-methyl-4-phenyl-hexahydroazulenyl. In these compounds, the preferred positions of substitution are the 1-position and/or the 3-position. X and Y each particularly preferably represents a chlorine atom, methyl or diethylamino.

In formula [6] or [8], Q and Q' each preferably represents ethylene, dimethylsilylene, or isopropylidene, and Z particularly preferably represents t-butylamide, phenylamide or cyclohexylamide.

Preferred component [A2] is comprised of every combination of these specific groups exemplified as A, A', X, Y, Q, Q' and Z.

Further, particularly preferred [A2] zirconium compound is a compound represented by formula [5], wherein A and A' are substituted at three positions to one position with an alkyl group having from 1 to 20 carbon atoms or unsubstituted, and in the case where A and A' are substituted at two or three positions, A and A' represent a cyclopentadienyl group and respectively having substituents at least at the 1-position and the 3-position, or A and A' represent a cyclopentadienyl group, wherein two substituents may be condensed to each other to form an indenyl ring. The most preferred [A2] is a compound represented by formula [5], wherein A and A' are substituted at two positions with an alkyl group having from 1 to 20 carbon atoms.

The preferred examples of zirconium compounds are shown below:
(1) bis(cyclopentadienyl)zirconium dichloride,
(2) bis(methylcyclopentadienyl)zirconium dichloride,
(3) bis(dimethylcyclopentadienyl)zirconium dichloride,
(4) bis(trimethylcyclopentadienyl)zirconium dichloride,
(5) bis(n-butylcyclopentadienyl)zirconium dichloride,
(6) bis (ethyl-n-butyl-cyclopentadienyl)zirconium dichloride,
(7) bis(n-butyl-methyl-cyclopentadienyl)zirconium dichloride,
(8) (cyclopentadienyl)(n-butyl-cyclopentadienyl)zirconium dichloride,
(9) bis(indenyl)zirconium dichloride,
(10) bis(tetrahydroindenyl)zirconium dichloride,
(11) bis(2-methylindenyl)zirconium dichloride,
(12) bis(2-methyltetrahydroindenyl)zirconium dichloride,
(13) bis(cyclopentadienyl)zirconium dimethyl,
(14) bis(cyclopentadienyl)zirconium diphenyl,
(15) bis(1,3-dimethylcyclopentadienyl)zirconium dimethyl,
(16) bis(1-n-butyl-3-methyl-cyclopentadienyl)zirconium dimethyl,
(17) (cyclopentadienyl)(indenyl)zirconium dichloride,
(18) (cyclopentadienyl)(fluorenyl)zirconium dichloride,
(19) (cyclopentadienyl)(azulenyl)zirconium dichloride, etc.

<Combination of Component [A1] and Component [A2]>

In the present invention, the specific examples of particularly preferred combinations of [A1] and [A2] are the following combinations of [A1] and [A2].

[A1]:
(1) bis(n-butylcyclopentadienyl)hafnium dichloride,
(2) bis(n-butylcyclopentadienyl)hafnium dimethyl,
(3) bis(i-propylcyclopentadienyl)hafnium dichloride,
(4) bis(1,3-dimethylcyclopentadienyl)hafnium dichloride,
(5) bis(1-n-butyl-3-methyl-cyclopentadienyl)hafnium dichloride,
(6) bis(4,5,6,7-tetrahydroindenyl)hafnium dichloride,
(7) bis[2-methyl-(4,5,6,7-tetrahydroindenyl)]hafnium dichloride,
(8) 1,2-ethylenebis(4,5,6,7-tetrahydroindenyl)zirconium dichloride,
(9) 1,2-ethylenebis(4,5,6,7-tetrahydroindenyl)hafnium dichloride.

[A2]:
(1) bis(cyclopentadienyl)zirconium dichloride,
(2) bis(1,3-dimethylcyclopentadienyl)zirconium dichloride,
(3) bis(1,3-dimethylcyclopentadienyl)zirconium dimethyl,
(4) bis(1-n-butyl-3-methyl-cyclopentadienyl)zirconium dichloride,
(5) bis(1-n-butyl-3-methyl-cyclopentadienyl)zirconium dimethyl,
(6) bis(1,2,3-trimethylcyclopentadienyl)zirconium dichloride,
(7) bis (1,3,4-trimethylcyclopentadienyl) zirconium dichloride,
(8) bis[2-methyl-(4,5,6,7-tetrahydroindenyl)]zirconium dichloride.

<[B] Phyllosilicate>

Component [B] for use in the present invention is silicate accounting for almost all of clay minerals. Ion exchange phyllosilicate is preferred as [B]. Phyllosilicate is a silicate compound in which the faces of laminates formed by ionic bond and the like are piled up in parallel with weak bonding strength and taking a crystal structure. Almost all the phyllosilicates occur as the main components of clay minerals in nature, but phyllosilicates are not limited to natural products and artificial synthetic products can also be used.

As the specific examples of phyllosilicates, well-known phyllosilicates described, e.g., in Haruo Shirohzu, *Nendo Kobutsugaku (Clay Mineralogy)*, Asakura Shoten (1995), such as kaolin group, e.g., dickite, nacrite, kaolinite, anauxite, metahalloysiteandhalloysite, serpentine group, e.g., chrysotile, lizardite and antigorite, smectite group, e.g., montmorillonite, sauconite, beidellite, nontronite, saponite, taeniolite, hectorite, stevensite, bentonite and sauconite, vermiculite group, e.g., vermiculite, mica group, e.g., mica (including fluorine mica), illite, sericite and glauconite, attapulgite, sepiolite, palygorskite, bentonite, pyrophyllite, talc, and chlorite group are exemplified. These phyllosilicates may be mixed layers.

Of these phyllosilicates, smectite group, e.g., montmorillonite, sauconite, beidellite, nontronite, saponite, hectorite, stevensite and bentonite, vermiculite group and mica group (including fluorine mica) are preferred.

In general, montmorillonite, beidellite, saponite, nontrorite, hectorite and sauconite are representatives as smectite group. Commercially available products, e.g., "BENCLAY SL" (manufactured by MIZUSAWA INDUSTRIAL CHEMICALS, LTD.), "Kunipia" and "Smectone" (manufactured by Kunimine Industry Co., Ltd.), "Montmorillonite K10" (manufactured by Sigma Aldrich Japan K. K., Sude-Chemie AG), and "K-Catalysts series" (manufactured by Sude-Chemie AG) can be used in the present invention.

As representative mica group, e.g., muscovite, palagonite, phlogopite, biotite and lepidolite are known. It is also possible to use commercially available products, e.g., "Synthetic Mica Somashif" (manufactured by CO-OP CHEMICAL CO., LTD.), "Fluorine Phlogopite", "Fluorine Tetra-silicon Mica" and "Taeniolite" (manufactured by TOPY Industries, Ltd.). In addition, swelling fluorine mica includes those having a structure akin to smectite as described in The Clay Science Society of Japan compiled, *Nendo Handbook* (*Clay Handbook*), 2nd Ed. (1987), and they are included in smectite group in the present invention. Smectite group is especially preferred.

In general, natural products are in many cases non-ion exchange (non-swelling). In such a case, it is preferred to perform treatment to give a preferred ion exchange property (or as welling property) to these natural products. As such treatment, the following chemical treatments are particularly preferred.

That is, it is preferred that these phyllosilicates be subjected to chemical treatment. Chemical treatments are surface treatment of removing impurities adhered to the surfaces of phyllosilicates and treatment of affecting the crystal structure and the chemical composition of phyllosilicates, and both treatments can be used. Specifically, (a) acid treatment, (b) alkali treatment, (c) salt treatment, and (d) treatment with an organic substance are exemplified.

These treatments function to remove impurities on the surface of phyllosilicate, exchange cations among layers, and elute cations of, e.g., Al, Fe, Mg and the like in crystal structure, as a result, ionic complex, molecular complex and organic derivative are formed, thereby surface area, layer-to-layer spacing and solid acidity can be changed. These treatment may be performed alone or two or more treatments may be performed in combination.

As (a) acids used in chemical treatment, inorganic acids or organic acids suitable for the purpose, preferably, e.g., hydrochloric acid, sulfuric acid, nitric acid, acetic acid and oxalic acid are exemplified, and as (b) alkalis, e.g., NaOH, KOH and $NH_3$ are exemplified.

As (c) salts, compounds comprising a cation containing at least one atom selected from the group consisting of Group 2 to Group 14 atoms, and at least one anion selected from halogen atoms or the group consisting of anions derived from inorganic or organic anions are preferred.

More preferred salts are compounds having ions derived from Li, Mg, Ca, Al, Ti, Zr, Hf, V, Nb, Ta, Cr, Mn, W, Mn, Fe, Co, Ni, Cu, Zn, B, Al, Ge or Sn as cations, and ions derived from Cl, $SO_4$, $NO_3$, OH, $C_2H_4$ and $PO_4$ as anions.

As (d) organic substances, alcohols (aliphatic alcohols having from 1 to 4 carbon atoms, preferably, e.g., methanol, ethanol, propanol, ethylene glycol and glycerol, aromatic alcohols having from 6 to 8 carbon atoms, preferably, e.g., phenol), higher hydrocarbons (those having from 5 to 10, preferably from 5 to 8, carbon atoms, preferably, e.g., hexane and heptane) are exemplified.

In addition, formamide, hydrazine, dimethyl sulfoxide, N-methylformamide, and N,N-dimethylaniline are also preferably used.

Salts and acids may be used in combination of two or more.

When salt treatment and acid treatment are used in combination, there are methods of performing salt treatment first and then acid treatment, performing acid treatment first and then salt treatment, and performing salt treatment and acid treatment simultaneously. Treatment conditions by salts and acids are not particularly restricted, but it is preferred in general to perform treatment so as to elute at least a part of the matters constituting phyllosilicate by selecting the conditions of the concentration of the salt and acid of from 0.1 to 50 wt %, the treatment temperature of from room temperature to boiling point, and the treatment time of from 5 minutes to 24 hours. The salts and acids are used in organic solvents, e.g., toluene, n-heptane or ethanol, or if they are in a liquid state at treatment temperature, solvents may not be used, but preferably they are used as an aqueous solution.

Particle property of Component [B] of the invention can be controlled by pulverization, granulation, sizing or fractionation at any time before, during or after all the processes, and methods which are suitable for the purpose can be used arbitrarily. In particular, describing as to granulating methods, e.g., a spray granulating method, a rolling granulating method, a compression granulating method, a stirring granulating method, a briquetting method, a compacting method, an extrusion granulating method, a fluidized bed granulating method, an emulsification granulating method and a submerged granulating method are exemplified. Of the above methods, a spray granulating method, a rolling granulating method and a compression granulating method are particularly preferred.

The contacts of component [A1], component [A2] and component [B] are not particularly restricted, but they can be brought into contact in the following order.

a. After component [A1] and component [A2] are brought into contact, they are brought into contact with component [B].
b. After component [A1] and component [B] are brought into contact, they are brought into contact with component [A2].
c. After component [A2] and component [B] are brought into contact, they are brought into contact with component [A1].

In addition to the above, three components may be brought into contact at the same time.

The use amount of component [A1] and component [A2] is generally from 0.001 to 10,000 mmol per gram of component [B], preferably from 0.001 to 1 mmol, and more preferably from 0.005 to 0.5 mmol. The ratio of use amount of component [A1] to component [A2] is generally in the molar ratio of [A1] to the sum of [A1] and [A2], i.e., [A1]/{[A1]+[A2]}, of from 0.05 to 0.95, preferably from 0.15 to 0.85, and more preferably from 0.25 to 0.75. However, when the polymerization activities of the active site formed by each compound of component [A1] and component [A2] with component [B] are greatly different, if a catalyst obtained by contacting component [A1], component [A2], component [B] and, if necessary, [C] an organoaluminum compound is fit for the purpose, it is a matter of course that the present invention should not be limited by the above ratio of use amount.

<Organoaluminum Compound [C]>

In the present invention, [C] is a compound which is used according to necessity, and represented by the following formula;

(In the formula, $R^8$ represents a hydrocarbon group having from 1 to 20 carbon atoms, X represents hydrogen, halogen, or an alkoxyl group, j represents the numeral of $0<j \leq 3$.) The compound [C] is trialkylaluminum, e.g., trimethylaluminum, triethylaluminum, tripropylaluminum, triisobutylaluminum and trioctylaluminum, or halogen- or alkoxy-containing alkylaluminum, e.g., diethylaluminum monochloride and diethylaluminum methoxide. In addition to the above, aluminoxane, e.g., methylaluminoxane can also be used. Of these compounds, trialkylaluminum is particularly preferred.

It is preferred to use component [C] for capable of protecting a catalyst from deactivation due to the contact with a poisoning compound and accelerating the formation of an active site. In the case where component [C] is used, the order of contact of component [A1], component [A2], component [B] and component [C] is not especially restricted so long as the order is suitable for the purpose, but as a preferred contact order, a method of bringing component [B] into contact with component [C] in the first place and then bringing component [A1] and component [A2] into contact with the above contacted product is exemplified. At this time, it is preferred to take sufficiently long contact time of 10 minutes or more, preferably 30 minutes or more, so that component [A1] and component [A2] are efficiently carried on component [B]. However, since contact under high temperature accelerates the deterioration reaction of component [A1] and component [A2] and the formation of a heterogeneously supported state, the heterogeneously active site of polymerization reaction is formed, as a result, distribution of polymerization activity, molecular weight distribution of the produced polymer, distribution of copolymerization composition and distribution of stereo regularity are induced, so that the effect of the present invention is reduced in some cases. For preventing these things, the contact temperature in the absence of a monomer is 100° C. or less, preferably 80° C. or less, and more preferably 50° C. or less, and at the same time, it is preferred to perform washing of the catalyst with a solvent after the contact for the purpose of removing the heterogeneously active site of polymerization. As such solvents for washing, arbitrary solvents can be selected, provided that they do not have any functional group which deactivates the catalyst. The examples of such solvents include aliphatic alkanes, e.g., butane, pentane, hexane, heptane and decane, aromatic compounds, e.g., benzene, toluene, xylene and naphthalene, liquid alpha-olefins, e.g., propylene, 1-butene and 1-hexene.

A catalyst formed of the active site alone derived from component [A1] and component [A2] forming a substantially tenacious carrying state by washing with these solvents is most preferred.

As the component of catalyst, boron compounds, such as Lewis acid represented, e.g., by tris(pentafluorophenyl)borate, and anionic compounds, e.g., N,N-dimethylaniliniumtetrakis(pentafluorophenyl)borate, and triphenylcarboniumtetrakis(pentafluorophenyl)borate can also be used.

The use amount of component [C] is generally from 0.01 to 10,000 mmol per gram of component [B], preferably from 0.1 to 100 mmol, and more preferably from 0.2 to 10 mmol. Further, the atomic ratio of the transition metal including component [A1] and component [A2] to aluminum in component [C] is generally from 1:0.01 to 1,000,000, preferably from 1:0.1 to 100,000, and more preferably from 1:0.5 to 100.

Before using a catalyst containing component [A] and component [B] as the catalyst for olefin polymerization (main polymerization), a small amount of olefin, e.g., ethylene, propylene, 1-butene, 1-hexene, 1-octene, 4-methyl-1-pentene, 3-methyl-1-butene, vinyl cycloalkane, styrene, or non-conjugated diene can be preliminarily polymerized (pre-polymerization). Preferred olefins are ethylene, propylene, 1-butene and 1-hexene, and ethylene is more preferred. Since a pre-polymerized catalyst is stable in main polymerization, formation of a fine particle polymer due to the fragmentation of particles can be prevented and polymer particles excellent in flow ability can be manufactured. Pre-polymerization is preferred for capable of stable running of polymerization reaction. Further, pre-polymerization process has an advantage such that the formation of an active site can be accelerated. That is, industrial handling advantages by performing pre-polymerization are given such that component [B] is finely dispersed in pre-polymerized catalyst particles, thereby the surface thereof area increases and the precursory point of a polymerization active site is newly formed, or a polymerization active site is included in the pre-polymerized polymer, thereby the contact of the active site with a poisoning compound is limited and deactivation can be prevented.

The pre-polymerization by ethylene and the like can be performed at any time before, during or after all the manufacturing processes of catalyst as long as the effect remains. It is preferred to perform pre-polymerization by ethylene in the presence of an inert solvent or in the absence of a solvent (or, when liquid alpha-olefin is used in the pre-polymerization, in the liquid alpha-olefin), by newly adding organoaluminum as component [C], according to necessity, and feeding ethylene under the contact of each of the above components so that a polymer is formed in an amount of from 0.01 to 1,000 g per gram of [B] phyllosilicate, preferably from 0.1 to 100 g. The pre-polymerization temperature is generally from −100 to 100° C., preferably from −60 to 100° C., the pre-polymerization time is generally from 0.1 to 100 hours, preferably from 0.1 to 20 hours.

For forming a uniform polymerization active site and pre-polymerized catalyst particles, it is also preferred to suppress excessive polymerization reaction by adopting moderate pre-polymerization reaction conditions at the initial stage of the pre-polymerization process, such as a relatively low temperature of 50° C. or less and a low monomer-feeding rate. In this case, the low monomer-feeding velocity indicates the velocity which makes it possible to form the pre-polymerized polymer of from 0.01 to 10.0 g per gram of component [B] per hour, preferably 6.0 g or less, and more preferably 3.0 g or less, and the specific feeding velocity is also similarly from 0.01 to 10.0 g per gram of component [B] per hour, preferably 6.0 g or less, and more preferably 3.0 g or less. In addition, it is also effective to perform washing of the catalyst with a solvent after the pre-polymerization process for the purpose of removing the heterogeneously active site of polymerization similar to the method as described in the preferred contact order of component [A1], component [A2], component [B] and component [C]. When fine particles are formed from the fragmentation of catalyst particles in the pre-polymerization process, the catalyst washing is also effective to remove the fine particles, and so it is preferred to perform the washing.

A polymerization reaction of olefin is carried out by using the above-obtained catalyst component, and an organoaluminum compound is used, if necessary. As the organoaluminum compounds used at this time, the similar compounds to the above component [C] are exemplified. The amount of the organoaluminum compound used is preferably selected so that the molar ratio of the transition metal in the catalyst component [A] to the aluminum in the organoaluminum compound becomes from 1:0 to 10,000.

As the olefins which can be polymerized by the above catalyst for olefin polymerization, ethylene, propylene, 1-butene, 1-hexene, 1-octene, 3-methylbutene-1,3-methylpentene-1, 4-methylpentene-1, vinyl cycloalkane, styrene, or derivatives of these olefins are exemplified. Further, diolefin, e.g., 1,5-hexadiene and butadiene, can also be used. Random copolymerization and block copolymerization are preferably applicable to the polymerization for manufacturing olefin polymers besides homopolymerization, and diolefin, such as 1,5-hexadiene and butadiene, may be copolymerized with the above olefins.

When copolymerization is carried out, it is preferred that olefins which can be polymerized contain ethylene and further at least one alpha-olefin having from 3 to 20 carbon atoms. In addition, it is also preferred that the olefins which can be polymerized contain at least one alpha-olefin having from 6 to 20 carbon atoms, and it is more preferred that the olefins contain 1-hexene.

Particularly preferred low melting point olefin polymers to be manufactured are copolymers of ethylene and alpha-olefin, preferably copolymers of ethylene and 1-hexene, which can be manufactured by polymerizing the above monomers which can be polymerized in the presence of the catalyst according to the present invention, having, e.g., a density of from 0.890 to 0.930 g/cm$^3$, preferably from 0.895 to 0.925 g/cm$^3$, more preferably from 0.900 to 0.920/cm$^3$, and particularly preferably from 0.900 to 0.910 g/cm$^3$, and MI of from 0.1 to 100 g/10 g/10 minutes, preferably from 0.1 to 20 g/10 minutes, more preferably from 0.1 to 10 g/10 minutes, and particularly preferably from 3 to 5 g/10 minutes.

It is preferred to perform polymerization reaction in the presence of inert hydrocarbon, e.g., butane, pentane, hexane, heptane, toluene or cyclohexane, and a solvent, e.g., liquefied alpha-olefin, or by gas phase polymerization substantially in the absence of a solvent and a liquid phase of monomer. Gas phase polymerization can be performed with a reactor, e.g., a stirring-fluidized bed equipped with a fluidized bed, a stirring bed and stirrer/mixer. Conditions such as the polymerization temperature and the polymerization pressure are not particularly restricted, however, the polymerization temperature is generally from −50 to 250° C., preferably from 0 to 100° C., and more preferably from 60 to 95° C., and the polymerization pressure is generally from atmospheric pressure to about 2,000 kgf/cm$^2$, preferably from atmospheric pressure to 200 kgf/cm$^2$, and more preferably from atmospheric pressure to 50 kgf/cm$^2$. Hydrogen may be present in the system of polymerization as the molecular weight adjustor.

The catalyst for olefin polymerization used in the present invention has high polymerization activity and an appropriately high initial activity, and the particle sizes rapidly enlarge in a reactor, so that it is possible to reduce the troubles by fine particle, such as agglomeration and adhesion, and the manufacture of olefin polymer particles excellent in flowability becomes possible.

Since the particle sizes of the catalyst particles just after being put into a polymerization reactor are generally small as compared with the particle sizes of other polymer particles, adhesion of the particles to the wall of the reactor, agglomeration of particles to each other, and scattering from the reactor are liable to occur, thus stable running of polymerization is easily hindered. For preventing such hindrance, it is necessary that polymerization of the catalyst put into a reactor should rapidly progress to enlarge the particle sizes.

By the coexistence of component [A1] and component [A2] on the same catalyst, the improvement of the efficiency of activity which cannot be achieved by each component alone can be achieved for the first time by the synergistic effect of two components in the present invention. It is thought that the adhesion of a polymer to the wall of a reactor and the pipe line for circulating gas are caused by the adhesion and agglomeration of catalyst particles and particles not grown. Therefore, when polymerization activity is improved, the feeding amount of a catalyst can be reduced and running stability of polymerization can be elevated.

According to the present invention, continuous and stable running of polymerization can be performed on an industrial scale for a long period of time without clogging of discharge line and arising of troubles of temperature control and the like due to adhesion of a product polymer to the wall of a reactor. According to the invention, it becomes possible to manufacture low melting point olefin polymers, e.g., a plurality of olefin copolymers and alpha-olefin polymers having low stereo regularity including ethylene, which were conventionally difficult to be manufactured particularly by a gas phase polymerization process for their low melting temperatures.

In particular, the present invention is suitable to manufacture ethylene-alpha-olefin copolymers having density of from 0.895 to 0.925 g/cm$^3$, preferably from 0.900 to 0.920 g/cm$^3$, and an MI (Melt Index) of from 0.1 to 10 g/10 minutes, preferably from 3 to 5 g/10 minutes, preferably copolymers of ethylene and 1-hexene, particularly by gas phase polymerization.

EXAMPLE

The present invention will be described in detail below with reference to specific examples, but the present invention should not be construed as being limited thereto, The polymerization activity of a catalyst is shown by the amount formed of polymerization (in grams) per gram of component [B]

<Measurement of MI and FR>

MI was measured at 190° C. with a load of 2.16 kg in accordance with JIS K6760. FR is computed from the ratio of the melt index measured in the same manner on the conditions of 190° C. and a load of 10 kg, $I_{10}$ kg to MI ($I_{10}$ $_{kg}$/MI).

<Measurement of Density>

Density is measured in accordance with JIS-K7112. A strand obtained at melt index measurement is subjected to heat treatment at 100° C. for 1 hour, followed by standing for further 1 hour at room temperature, and then the density is measured by a density gradient tube method.

<BD of Product>

BD of a product is the apparent density of a polymer powder (also referred to as bulk density, BD) in accordance with JIS K7365.

Example 1

(1) Acid Treatment of Clay Mineral

A granulated classified product of swelling montmorillonite of a commercial product ("BENCLAY SL", manufactured by MIZUSAWA INDUSTRIAL CHEMICALS, LTD., average particle size: 27 μm) (37 kg) was dispersed in 148 kg of a 25% sulfuric acid and stirred at 90° C. for 2 hours, and the dispersed product was filtered and washed with demineralized water.

(2) Titanium Salt Treatment and Drying of Clay Mineral

The full amount of the sulfuric acid-treated montmorillonite cake obtained in the above (1) was dispersed in 236 kg of an aqueous solution of titanyl sulfate of a commercial product (manufactured by Sakai Chemical Industry Co., Ltd., containing 7.5% of $TiO_2$ and 25.6% of $SO_4$), and the dispersion was stirred at 30° C. for 3 hours. The stirred product was filtered and washed with demineralized water until the pH reached 3.5, and the resulting water-containing solid cake was preliminarily dried at 110° C. for 10 hours, thereby montmorillonite treated with titanium salt was obtained. Of the preliminarily dried montmorillonite, the particles filtered through a screen of 150-mesh aperture were further continuously dried at 200° C. under a nitrogen counter current (a nitrogen flow rate of 49 Nm$^3$/hr) at a velocity of 3 kg/hr (residence time of 10 minutes) in a rotary kiln, and recovered under drying nitrogen.

(3) Preparation of Catalyst and Preliminary Polymerization

Under a nitrogen atmosphere, 164 ml of n-heptane and 10 g of the dried montmorillonite particles obtained in (2) above (component [B]) were slurried with 250 ml of n-heptane and introduced into a reactor having a capacity of 1 liter equipped with an induction stirrer. While maintaining the temperature of the system at 30° C., 9.6 mmol (1.096 g) of triethylaluminum was added thereto and the reaction system was stirred for 10 minutes. Subsequently, while maintaining the same temperature, bis(1-n-butyl-3-methylcyclopentadienyl) zirconium dichloride as component [A2] (a solution comprising 1.20 mmol, i.e., 0.5191 g, of bis (1-n-butyl-3-methylcyclopentadienyl) zirconium dichloride dispersed in 173.0 ml of n-heptane), and bis(n-butylcyclopentadienyl)hafnium dichloride (a solution comprising 1.20 mmol, i.e., 0.5902 g, of bis(n-butylcyclopentadienyl)hafnium dichloride dispersed in 196.7 ml of n-heptane) as component [A1] were continuously added to the above reaction solution and the temperature of the system was raised to 78° C. After the system was allowed to react at 78° C. for 10 minutes, ethylene gas was introduced thereto at a velocity of 1.0 NL/min. for 57 minutes to perform preliminary polymerization. Feeding of ethylene was stopped and the ethylene gas in the reactor was substituted with nitrogen.

(4) Washing and Drying of Preliminarily Polymerized Catalyst

The slurry of the preliminarily polymerized catalyst obtained in (3) above was poured into a flask, and washed at 60° C. with n-heptane until the washing rate reached 1/15. After that, the temperature was elevated to 70° C. and the solvent was distilled off by drying under reduced pressure, thereby 81.7 g of preliminarily polymerized catalyst powder was recovered.

(5) Copolymerization of Ethylene/1-hexene

Gas phase copolymerization of ethylene/1-hexene was performed with the preliminarily polymerized catalyst powder obtained in (4) above. That is, 51 mg/hr of the preliminarily polymerized catalyst as component [B], 100 mg/hr of triisobutylaluminum and 68 mg/hr of diethylaluminuin ethoxide were intermittently fed to a continuous type gas phase polymerization reactor of flowing mixed gas of ethylene, 1-hexene and hydrogen (1-hexene/ethylene=2.2 mol %, hydrogen/ethylene=0.041 mol %). The conditions of polymerization reaction were such that the temperature was 90° C., ethylene partial pressure was 18 kg/cm$^2$, and the average residence time was 4.1 hours. The average polymerization rate of polyethylene formed on and after the elapse of 12 hours from the beginning of feeding of the preliminarily polymerized catalyst was 294 g/hr. The results of polymerization are shown in Table 1 below. The physical properties of the products which were manufactured during 1 hour after the elapse of 18 hours and recovered were measured. The results obtained are shown in Table 2 below.

Example 2

A preliminarily polymerized catalyst was manufactured in the same manner as in (3) and (4) in Example 1 except that bis(1-n-butyl-3-methylcyclopentadienyl)zirconium dichloride (a solution comprising 0.48 mmol, i.e., 0.2076 g, of bis(1-n-butyl-3-methylcyclopentadienyl)zirconium dichloride dispersed in 69.2 ml of n-heptane) was used as component [A2], and bis(n-butylcyclopentadienyl)hafnium dichloride (a solution comprising 1.92 mmol, i.e., 0.9442 g, of bis(n-butylcyclo-pentadienyl)hafnium dichloride dispersed in 314.7 ml of n-heptane) was used as component [A1], and 79.2 g of preliminarily polymerized catalyst powder was recovered. Copolymerization of ethylene/1-hexene was performed with the preliminarily polymerized catalyst powder in the same manner as in (5) in Example 1. The results of polymerization and the physical properties of the product are respectively shown in Table 1 and Table 2.

Comparative Example 1

A preliminarily polymerized catalyst was manufactured in the same manner as in (3) and (4) in Example 1 except that bis(1-n-butyl-3-methylcyclopentadienyl)zirconium dichloride (a solution comprising 2.40 mmol, i.e., 1.0382 g, of bis(1-n-butyl-3-methylcyclopentadienyl)zirconium dichloride dispersed in 346.1 ml of n-heptane) was used as component [A2], and component [A1] was not used, and 79.9 g of preliminarily polymerized catalyst powder was recovered. Copolymerization of ethylene/1-hexene was performed with the preliminarily polymerized catalyst powder in the same manner as in (5) in Example 1. The results of polymerization and the physical properties of the product are respectively shown in Table 1 and Table 2.

Comparative Example 2

A preliminarily polymerized catalyst was manufactured in the same manner as in (3) and (4) in Example 1 except that component [A2] was not used and bis(n-butylcyclopentadienyl)-hafnium dichloride (a solution comprising 2.40 mmol, i.e., 1.1803 g, of bis(n-butylcyclopentadienyl)hafnium dichloride dispersed in 393.4 ml of n-heptane) was used as component [A1], and 86.8 g of preliminarily polymerized catalyst powder was recovered. Copolymerization of ethylene/1-hexene was performed with the preliminarily polymerized catalyst powder in the same manner as in (5) in Example 1. The discharge line of a product polymer clogged up with a block of polymer after the elapse of 11 hours from the beginning of feeding of the preliminarily polymerized catalyst, so that it was impossible to continue running. The results of polymerization and the physical properties obtained from the product manufactured during 1 hour before stopping of running are respectively shown in Table 1 and Table 2.

Example 3

A preliminarily polymerized catalyst was manufactured in the same manner as in (3) and (4) in Example 1 except that bis(1,3-dimethylcyclopentadienyl)zirconium dichloride (a solution comprising 1.20 mmol, i.e., 0.4181 g, of bis(1,3-dimethylcyclopentadienyl)zirconium dichloride dispersed in 139.4 ml of n-heptane) was used as component [A2], and bis(n-butylcyclopentadienyl)hafnium dichloride (a solution comprising 1.20 mmol, i.e., 0.5902 g, of bis(n-butylcyclopentadienyl)hafnium dichloride dispersed in 196.7 ml of n-heptane) was used as component [A1], and 75.8 g of preliminarily polymerized catalyst powder was recovered. Copolymerization of ethylene/1-hexene was performed with the preliminarily polymerized catalyst powder in the same manner as in (5) in Example 1. The results of polymerization and the physical properties of the product are respectively shown in Table 1 and Table 2.

Example 4

A preliminarily polymerized catalyst was manufactured in the same manner as in (3) and (4) in Example 1 except that bis(1,3-dimethylcyclopentadienyl)zirconium dichloride (a solution comprising 0.48 mmol, i.e., 0.1672 g, of bis(1,3-dimethylcyclopentadienyl)zirconium dichloride dispersed in 55.7 ml of n-heptane) was used as component [A2], and bis(n-butylcyclopentadienyl)hafnium dichloride (a solution comprising 1.92 mmol, i.e., 0.9442 g, of bis(n-butylcyclopentadienyl)hafnium dichloride dispersed in 314.7 ml of n-heptane) was used as component [A1], and 78.3 g of preliminarily polymerized catalyst powder was recovered. Copolymerization of ethylene/1-hexene was performed with the preliminarily polymerized catalyst powder in the same manner as in (5) in Example 1. The results of polymerization and the physical properties of the product are respectively shown in Table 1 and Table 2.

Comparative Example 3

A preliminarily polymerized catalyst was manufactured in the same manner as in (3) and (4) in Example 1 except that bis(1,3-dimethylcyclopentadienyl)zirconium dichloride (a solution comprising 2.40 mmol, i.e., 0.8362 g, of bis(1,3-dimethylcyclopentadienyl)zirconium dichloride dispersed in 278.8 ml of n-heptane) was used as component [A2], and component [A1] was not used, and 82.1 g of preliminarily polymerized catalyst powder was recovered. Copolymerization of ethylene/1-hexene was performed with the preliminarily polymerized catalyst powder in the same manner as in (5) in Example 1. The discharge line of a product polymer clogged up with a block of polymer after the elapse of 13 hours from the beginning of feeding of the preliminarily polymerized catalyst, so that it was impossible to continue running. The results of polymerization and the physical properties obtained from the product manufactured during 1 hour before stopping of running are respectively shown in Table 1 and Table 2.

Example 5

(1) Acid Treatment of Clay Mineral

A granulated classified product of swelling montmorillonite of a commercial product ("BENCLAY SL", manufactured by MIZUSAWA INDUSTRIAL CHEMICALS, LTD., average particle size: 38 $\mu$m) (40 kg) was dispersed in 160 kg of a 25% sulfuric acid and stirred at 90° C. for 2 hours, and the dispersed product was filtered and washed with demineralized water until the pH reached 3.5. The resulting water-containing solid cake was preliminarily dried at 110° C. for 10 hours, thereby montmorillonite treated with acid was obtained. Of the preliminarily dried montmorillonite, the particles filtered through a screen of 150-mesh aperture were further continuously dried at 200° C. under a nitrogen counter current (a nitrogen flow rate of 49 Nm$^3$/hr) at a velocity of 3 kg/hr (residence time of 10 minutes) in a rotary kiln, and recovered under drying nitrogen.

(2) Preparation of Catalyst and Preliminary Polymerization

Under a nitrogen atmosphere, 100 g of the dried montmorillonite particles obtained in (1) above (component [B]) slurried with 1.00 liter of n-heptane, and 2.47 liters of n-heptane were introduced into a reactor having a capacity of 10 liters equipped with an induction stirrer. While maintaining the temperature of the system at 20° C., 96.0 mmol (10.96 g) of triethylaluminum was added thereto and the reaction system was stirred for 10 minutes. Subsequently, while maintaining the same temperature, bis(1-n-butyl-3-methylcyclopentadienyl)zirconium dichloride as component [A2] (a solution comprising 12.00 mmol, i.e., 5.191 g, of bis(1-n-butyl-3-methylcyclopentadienyl)zirconium dichloride dispersed in 0.45 liters of n-heptane) and bis(n-butylcyclopentadienyl) hafnium dichloride (a solution comprising 12.00 mmol, i.e., 5.900 g, of bis(n-butylcyclopentadienyl)hafnium dichloride dispersed in 0.45 liters of n-heptane) as component [A1] were continuously added to the above reaction solution and the temperature of the system was raised to 78° C. After the system was allowed to react at 78° C. for 10 minutes, ethylene gas was introduced thereto at a velocity of 10.0 NL/min. for 61 minutes to perform preliminary polymerization. Feeding of ethylene was stopped and the ethylene gas in the reactor was substituted with nitrogen.

(3) Washing of Preliminarily Polymerized Catalyst

The slurry of the preliminarily polymerized catalyst obtained in (2) above was cooled to 60° C. and 5.0 liters of n-heptane was added thereto. The full volume of the solution of preliminarily polymerized catalyst slurry at this time was 10.4 liters. After stirring the solution at 60° C. for 5 minutes, stirring was stopped and the solution was allowed to stand for 15 minutes for precipitation, and 7.0 liters of the supernatant was removed. A process of adding 6.5 liters of n-heptane, stirring at 60° C. for 5 minutes, standing for 15 minutes for precipitation, and removing 6.5 liters of the supernatant was repeated three times. In the last place, n-heptane was added to make the full amount of the solution 5.0 liters.

(4) Drying of Preliminarily Polymerized Catalyst

The full amount of the preliminarily polymerized catalyst slurry subjected to washing in (3) above was placed under a nitrogen atmosphere, and then extracted into a 15-liter bath-type vibrating system vacuum drier equipped with a steam jacket for conducted heat acceptance. Four liters of heptane was added to the reactor and all the remaining contents in the reactor were extracted into the drier. After standing the preliminarily polymerized catalyst slurry transferred to the drier and removing about 5 liters of the supernatant, the solvent was distilled off by drying under reduced pressure with heating at 70° C. While maintaining the same temperature, it was visually confirmed that almost all the solvent was distilled off, and then the catalyst slurry was subjected to drying for 2 hours under reduced pressure, as a result, 791 g of preliminarily polymerized catalyst powder was recovered.

(5) Evaluation of Polymerization

Copolymerization of ethylene/1-hexene was performed with the preliminarily polymerized catalyst powder obtained in (4) above in the same manner as in (5) in Example 1. The results of polymerization and the physical properties of the product are respectively shown in Table 1 and Table 2.

(6) Blending of Additives

The following antioxidant and neutralizer were blended to the obtained ethylene/1-hexene copolymer as additives, and they were kneaded and granulated with a uniaxial extruder having a bore diameter of 20 mm.

Antioxidant: Octadecyl-3-(3,5-t-butyl-4-hydroxyphenyl)-propionate (Irganox 1076, manufactured by Ciba Specialty Chemicals Inc.), 1,000 ppm:

tetrakis(2,4-di-butylphenyl)-4,4-biphenylene-diphosphite (PEPQ, manufactured by Clariant Japan K. K.), 700 ppm Neutralizer: Calcium stearate (Ca-St (B. K), manufactured by NITTO KASEI CO., LTD.)), 300 ppm (7) Film Forming and Evaluation Blown film extrusion was performed using a uniaxial extruder having a bore diameter of 30 mm on the following running conditions.

Screw: Bore diameter: 30 mm, L/D: 25, full flight type

Screw engine speed: About 27 rpm

Die: Spiral mandrel die, bore diameter: 30 mm, Lip width: 2.0 mm

Resin temperature: 180° C.

Film size: Lay flat width: 78 mm, thickness: 20 $\mu$m

The number of fish eyes (abbreviated to FE in Tables) having the size of a longer diameter of 0.1 mm or more per gram of the film obtained by visually observing the obtained film was 16.2/g.

Comparative Example 4

A preliminarily polymerized catalyst was manufactured in the same manner as in (2), (3) and (4) in Example 5 except that bis(1-n-butyl-3-methylcyclopentadienyl)zirconium dichloride (a solution comprising 24.00 mmol, i.e., 10.382 g, of bis (1-n-butyl-3-methylcyclopentadienyl) zirconium dichloride dispersed in 0.90 liters of n-heptane) was used as component [A2], and component [A1] was not used, and 775 g of preliminarily polymerized catalyst powder was recovered. Evaluation of polymerization, blending of additives and film forming and evaluation were performed with the preliminarily polymerized catalyst powder in the same manner as in (5), (6) and (7) in Example 5. The results of polymerization and the physical properties of the product are respectively shown in Table 1 and Table 2.

Comparative Example 5

A preliminarily polymerized catalyst was manufactured in the same manner as in (2), (3) and (4) in Example 5 except that component [A2] was not used, and bis(n-butylcyclopentadienyl)hafnium dichloride (a solution comprising 24.00 mmol, i.e., 11.80 g, of bis(n-butylcyclopentadienyl)hafnium dichloride dispersed in 0.90 liters of n-heptane) was used as component [A1], and 650 g of preliminarily polymerized catalyst powder was recovered. Evaluation of polymerization was performed with the preliminarily polymerized catalyst powder in the same manner as in (5) in Example 5. The discharge line of a product polymer clogged up with a block of polymer after the elapse of 10 hours from the beginning of feeding of the preliminarily polymerized catalyst, so that it was impossible to continue running. The results of polymerization and the physical properties obtained from the product manufactured during 1 hour before stopping of running are respectively shown in Table 1 and Table 2.

Example 6

(1) Acid Treatment of Clay Mineral

Commercially available montmorillonite (8 kg) ("Kunipia F", manufactured by Kunimine Industry Co., Ltd.) was pulverized by a vibrating ball mill, dispersed in 50 liters of demineralized water having dispersed therein 10 kg of magnesium chloride, and stirred at 80° C. for 1 hour. The obtained solid component was washed with water, dispersed in 56 liters of an 8.2% hydrochloric acid aqueous solution, stirred at 90° C. for 2 hours, and washed with demineralized water. The solid concentration of 4.6 kg of water slurry of the thus-obtained montmorillonite was adjusted to 15.2%, and then subjected to spray granulation by a spray drier. The shape of particles obtained by the granulation was spherical.

(2) Chromium Salt Treatment and Drying of Clay Mineral

In the next place, the granulated montmorillonite obtained in (1) above was batched off to a 1-liter flask, and dispersed in 400 ml of demineralized water having dissolved therein 48 g of chromic acid 9 hydrate [$Cr(NO_3)_2 \cdot 9H_2O$], and stirred at 90° C. for 3 hours. After the treatment, the solid component was subjected to washing with demineralized water and preliminary drying, thereby chromium salt-treated montmorillonite was obtained. The preliminarily dried chromium salt-treated montmorillonite was put in a 200 ml flask and underwent dehydration treatment with heating at 200° C. under reduced pressure of 1 mmHg for 2 hours.

(3) Preparation of Catalyst and Preliminary Polymerization

Under a nitrogen atmosphere, 374 ml of n-heptane and 10 g of the dried montmorillonite particles obtained in (2) above (component [B]) were slurried with 250 ml of n-heptane and introduced into a reactor having a capacity of 1 liter equipped with an induction stirrer. While maintaining the temperature of the system at 30° C., 9.6 mmol (1.096 g) of triethylaluminum was added thereto and the reaction system was stirred for 10 minutes. Subsequently, while maintaining the same temperature, biscyclopentadienylzirconium dichloride as component [A2] (a solution comprising 0.40 mmol, i.e., 0.1170 g, of biscyclopentadienylzirconium dichloride dispersed in 40 ml of toluene), and 1,2-ethylenebis(4,5,6,7-tetrahydroindenyl)zirconium dichloride (a solution comprising 0.40 mmol, i.e., 0.1714 g, of 1,2-ethylenebis(4,5,6,7-tetrahydroindenyl)zirconium dichloride dispersed in 40 ml of toluene) as component [A1] were continuously added to the above reaction solution and the temperature of the system was raised to 78° C. After the system was allowed to react at 78° C. for 10 minutes, ethylene gas was introduced thereto at a velocity of 1.0 NL/min. for 57 minutes to perform preliminary polymerization. Feeding of ethylene was stopped and the ethylene gas in the reactor was substituted with nitrogen.

(4) Drying of Preliminarily Polymerized Catalyst

The slurry of the preliminarily polymerized catalyst obtained in (3) above was poured into a flask, the temperature was elevated to 70° C. and the solvent was distilled off by drying under reduced pressure, thereby 80.5 g of preliminarily polymerized catalyst powder was recovered.

(5) Copolymerization of Ethylene/1-butene

Slurry copolymerization of ethylene/1-butene was performed with the preliminarily polymerized catalyst powder obtained in (4) above. That is, 1.5 liters of n-heptane, 2.5 mmol of triethylaluminum and 100 ml of 1-butene were put in a 3 liter autoclave, and the temperature was elevated to 65° C. Subsequently, 100 mg of the preliminarily polymerized catalyst obtained in (4) as component [B] was added thereto with ethylene, and polymerization was carried out at 65° C. for 2 hours with feeding mixed gas of ethylene and 1-butene (1-butene/ethylene=7.0 wt %) correspondingly to the ethylene consumption while maintaining the full pressure at 22 kg/cm$^2$-G. After 2 hours, ethanol was added and polymerization was stopped. The amount of the ethylene-1-butene copolymer obtained was 218 g. The results of polymerization and the physical properties of the product are respectively shown in Table 3 and Table 4.

Comparative Example 6

A preliminarily polymerized catalyst was manufactured in the same manner as in (3) and (4) in Example 6 except that 1,2-ethylenebis(4,5,6,7-tetrahydroindenyl)zirconium dichloride (a solution comprising 0.80 mmol, i.e., 0.3428 g, of 1,2-ethylenebis(4,5,6,7-tetrahydroindenyl)zirconium dichloride dispersed in 80 ml of toluene) was used as component [A1], and component [A2] was not used, and 82.5 g of preliminarily polymerized catalyst powder was recovered. Evaluation of polymerization was performed with the preliminarily polymerized catalyst powder in the same manner as in (5) in Example 6. The results of polymerization and the physical properties of the product are respectively shown in Table 3 and Table 4.

Comparative Example 7

A preliminarily polymerized catalyst was manufactured in the same manner as in (3) and (4) in Example 6 except that biscyclopentadienylzirconium dichloride (a solution comprising 0.80 mmol, i.e., 0.2339 g, of biscyclopentadienylzirconium dichloride dispersed in 80 ml of toluene) was used as component [A2], and component [A1] was not used, and 79.0 g of preliminarily polymerized catalyst powder was recovered. Evaluation of polymerization was performed with the preliminarily polymerized catalyst powder in the same manner as in (5) in Example 6. The results of polymerization and the physical properties of the product are respectively shown in Table 3 and Table 4.

Example 7

Copolymerization of ethylene/1-hexene was performed in the same manner as in (5) in Example 5, except that mixed gas of ethylene, 1-hexene and hydrogen was changed to 1-hexene/ethylene=3.3 mol %, hydrogen/ethylene 0.017 mol %. Blending of additives and film forming and evaluation were performed in the same manner as in (6) and (7) in Example 5. The results of polymerization and the physical properties of the product are respectively shown in Table 5 and Table 6.

Comparative Example 8

Copolymerization of ethylene/1-hexene was performed in the same manner as in Comparative Example 4, except that mixed gas of ethylene, 1-hexene and hydrogen was changed to 1-hexene/ethylene=3.8 mol %, hydrogen/ethylene=0.025 mol %. The discharge line of a product polymer clogged up with a block of polymer after the elapse of 10 hours from the beginning of feeding of the preliminarily polymerized catalyst, so that it was impossible to continue running. The results of polymerization and the physical properties obtained from the product manufactured during 1 hour before stopping of running are respectively shown in Table 5 and Table 6.

Example 8

(1) Organoaluminum Treatment of Clay Mineral

Under a nitrogen atmosphere, 0.3441 liters of n-heptane and 100 g of the dried montmorillonite particles obtained in the same manner as in (1) in Example 5 (component [ ])were introduced into a reactor having a capacity of 2 liters equipped with a stirrer. While maintaining the temperature of the system at 30° C., 0.489 liters of an n-heptane solution containing triethylaluminum (concentration: 0.613 mol/liter) was added thereto. While maintaining the temperature, the system was allowed to react for 1 hour, and then washed with n-heptane until the washing rate reached 1/70 and the total amount was adjusted to 0.20 liters.

(2) Preparation of Catalyst

Subsequent to step (1), 0.80 liters of toluene was added to make the total amount 1.0 liter, while maintaining the temperature at 30° C., bis(1-n-butyl-3-methylcyclopentadienyl)zirconium dichloride as component [A2] (a solution comprising 12.00 mmol, i.e., 5.191 g, of bis(1-n-butyl-3-methylcyclopentadienyl)zirconium dichloride dispersed in 0.45 liters of toluene), and bis(n-butylcyclopentadienyl)hafnium dichloride (a solution comprising 12.00 mmol, i.e., 5.900 g, of bis (n-butylcyclopentadienyl) hafniumdichloride dispersed in 0.45 liters of toluene) as component [A1] were continuously added to the above reaction solution, and the system was allowed to react for 1 hour while maintaining the same temperature. After stopping stirring, the solution was allowed to stand for 30 minutes for precipitation, and 1.80 liters of the supernatant was removed. A procedure of adding the same amount of toluene as the amount of the supernatant removed and washing the catalyst slurry of contact reaction product was repeated four times. In the last place, toluene was added to make the full amount of the solution 2.00 liters.

(3) Preliminary Polymerization

Under a nitrogen atmosphere, 2.37 liters of n-heptane and the full amount of the catalyst slurry obtained in (2) above were introduced into a reactor having a capacity of 10 liters equipped with an induction stirrer. While maintaining the temperature of the system at 20° C., 96.0 mmol (10.96 g) of triethylaluminum was added thereto and the reaction system was stirred for 10 minutes. The temperature was raised to 40° C. and the system was allowed to react for 10 minutes. Subsequently, preliminary ethylene polymerization was performed. That is, as the first step, ethylene gas was introduced at 40° C. at a velocity of 3.3 NL/min. for 60 minutes, as the second step, the system was allowed to react for 20 minutes with raising the temperature of the system at a rate of 0.8° C./min on average and at a velocity of the ethylene gas introduction of 6.6 NL/min., and as the third step, the velocity of the ethylene gas introduction was raised at a rate of 0.14 NL/min$^2$ on average to reach 10 NL/min., thus preliminary polymerization was performed in total of 120 minutes. Feeding of ethylene was stopped and the ethylene gas in the reactor was substituted with nitrogen. The thus-obtained preliminarily polymerized catalyst slurry was cooled, and drying of the preliminarily polymerized catalyst was carried out in the same manner as in (4) in Example 5. As a result, 863 g of preliminarily polymerized catalyst powder was recovered.

(4) Evaluation of Polymerization

Copolymerization of ethylene/1-hexene was performed with the preliminarily polymerized catalyst powder obtained in (3) above in the same manner as in (5) in Example 1 except that mixed gas of ethylene, 1-hexene and hydrogen was changed to 1-hexene/ethylene=3.4 mol % and hydrogen/ethylene=0.037 mol %. Blending of additives and film forming and evaluation were performed in the same manner as in (6) and (7) in Example 5. The results of polymerization and the physical properties of the product are respectively shown in Table 5 and Table 6.

Example 9

(1) Zinc Salt Treatment and Drying of Clay Mineral

In a two-liter flask, 115 g of zinc sulfate 7 hydrate [Zn(SO$_4$).7H$_2$O], 10 g of sulfuric acid and 675 g of demineralized water were put and dissolved, and 200 g of the acid-treated montmorillonite obtained in (1) in Example 5 was dispersed therein and the reaction solution was stirred at 30° C. for 2 hours. After the treatment, the solid component was subjected to washing with demineralized water and preliminary drying, thereby zinc-treated montmorillonite was obtained. The preliminarily dried zinc-treated montmorillonite was put in a 1 liter flask and underwent dehydration treatment with heating at 200° C. under reduced pressure of 1 mm Hg for 2 hours.

(2) Organoaluminum Treatment of Clay Mineral and Preparation of Catalyst

The organoaluminum treatment of clay mineral and the preparation of catalyst were performed in the same manner as in (1) and (2) in Example 8, except for using the equivalent amount of the dried zinc-treated montmorillonite obtained in (1) above in place of the dried montmorillonite obtained in (1) in Example 5.

(3) Preliminary Polymerization

Under a nitrogen atmosphere, 2.37 liters of n-heptane was put in a reactor having a capacity of 10 liters equipped with an induction stirrer. While maintaining the temperature at 20° C., 48.0 mmol (5.50 g) of triethylaluminum was added thereto. While maintaining the same temperature, the full amount of the catalyst slurry obtained in (2) above was introduced and the reaction system was stirred for 10 minutes. The temperature was raised to 40° C. and the system was allowed to react for 10 minutes. Subsequently, preliminary ethylene polymerization was performed. That is, as the first step, ethylene gas was introduced at 40° C. at a velocity of 3.0 NL/min. for 89 minutes, as the second step, the system was allowed to react for 13 minutes with maintaining the same temperature and raising the introduction velocity of the ethylene gas to 7.5 NL/min., and as the third step, the temperature was raised to 80° C. over 33 minutes with maintaining the same introduction velocity of ethylene, thus preliminary polymerization was performed in total of 173 minutes. Feeding of ethylene was stopped and the ethylene gas in the reactor was substituted with nitrogen.

(4) Washing and Drying of Preliminarily Polymerized Catalyst

The obtained preliminarily polymerized catalyst slurry was cooled, and washing and drying of the preliminarily polymerized catalyst were performed in the same manner as in (3) and (4) in Example 5, except for performing washing at 30° C. and using toluene in place of n-heptane. As a result, 1,123 g of preliminarily polymerized catalyst powder was recovered.

(5) Evaluation of Polymerization

Copolymerization of ethylene/1-hexene was performed with the preliminarily polymerized catalyst powder obtained in (4) above in the same manner as in (5) in Example 1 except that mixed gas of ethylene, 1-hexene and hydrogen was changed to 1-hexene/ethylene=6.0 mol % and hydrogen/ethylene=0.033 mol %, and polymerization reaction was performed at 75° C. The results of polymerization and the physical properties of the product are respectively shown in Table 5 and Table 6.

Example 10

(1) Evaluation of Polymerization

Copolymerization of ethylene/1-hexene was performed with the preliminarily polymerized catalyst powder obtained in (4) in Example 9 in the same manner as in (5) in Example 9 except that mixed gas of ethylene, 1-hexene and hydrogen was changed to 1-hexene/ethylene=6.0 mol % and hydrogen/ethylene ~0.065 mol %. The results of polymerization and the physical properties of the product are respectively shown in Table 5 and Table 6.

Example 11

(1) Manufacture of Preliminarily Polymerized Catalyst Powder

Preliminarily polymerized catalyst powder was obtained in the same manner as in (3) and (4) in Example 6, except for using the equimolar amount of bis[2-methyl-(4,5,6,7-tetrahydroindenyl)]zirconium dichloride as component [A2] in place of biscyclopentadienylzirconium dichloride, and the equimolar amount of bis(4,5,6,7-tetrahydroindenyl)hafnium dichloride as component [A1] in place of 1,2-ethylenebis-(4,5,6,7-tetrahydroindenyl)zirconium dichloride.

(2) Copolymerization of Ethylene/1-hexene

Gas phase copolymerization of ethylene/1-hexene was performed with the preliminarily polymerized catalyst powder obtained in (1) above. That is, 100 g of sodium chloride which had been dried under reduced pressure at 90° C. for 6 hours was put in a 1 liter autoclave under a nitrogen atmosphere at room temperature, and 0.29 mmol of triisobutylaluminum (0.80 mol as the dilution solution of heptane) and 0.60 mmol of diethylaluminum ethoxide (0.57 mol as the dilution solution of heptane) were further added. After the inner temperature was raised to 90° C., mixed gas of ethylene and 1-hexene (1-hexene/ethylene=3.3 mol %) was introduced so as to reach 18 kgf/cm$^2$ in partial pressure, and then the preliminarily polymerized catalyst powder obtained in (1) (20 mg as component [B]) was pressed into the system with 2 ml of heptane by argon, thereby polymerization was initiated. Polymerization was performed at 90° C. for 1 hour by feeding mixed gas of the above composition correspondingly to consumption with maintaining full pressure. After one hour, the gas on the inside of the autoclave was eliminated and polymerization was stopped. The sodium chloride was removed by washing with water, thereby 18.5 g of ethylene/1-hexene copolymer was obtained. The results of polymerization and the physical properties of the product are respectively shown in Table 7 and Table 8.

Comparative Example 9

Manufacture of a preliminarily polymerized catalyst and evaluation of polymerization were performed in the same manner as in (1) and (2) in Example 11, except that 0.80 mmol of bis(4,5,6,7-tetrahydroindenyl)hafnium dichloride was used as component [A1] and component [A2] was not used. The results of polymerization and the physical properties of the product are respectively shown in Table 7 and Table 8.

Comparative Example 10

Manufacture of a preliminarily polymerized catalyst and evaluation of polymerization were performed in the same manner as in (1) and (2) in Example 11, except that 0.80 mmol of bis[2-methyl-(4,5,6,7-tetrahydroindenyl)] zirconium dichloride was used as component [A2] and component [A1] was not used. The results of polymerization and the physical properties of the product are respectively shown in Table 7 and Table 8.

Example 12

Manufacture of a preliminarily polymerized catalyst and evaluation of polymerization were performed in the same manner as in (1) and (2) in Example 11, except that the equimolar amount of bis(1-n-butyl-3-methylcyclopentadienyl)hafnium dichloride was used as component [A1] in place of bis (4, 5, 6, 7-tetrahydroindenyl) hafnium dichloride. The results of polymerization and the physical properties of the product are respectively shown in Table 7 and Table 8.

Comparative Example 11

Manufacture of a preliminarily polymerized catalyst and evaluation of polymerization were performed in the same manner as in (1) and (2) in Example 11, except that 0.80 mmol of bis(1-n-butyl-3-methylcyclopentadienyl)hafnium dichloride was used as component [A1] and component [A2] was not used. The results of polymerization and the physical properties of the product are respectively shown in Table 7 and Table 8.

Example 13

Manufacture of a preliminarily polymerized catalyst and evaluation of polymerization were performed in the same manner as in (1) and (2) in Example 11, except that the equimolar amount of 1,2-ethylenebis(4,5,6,7-tetrahydroindenyl)hafnium dichloride was used as component [A1] in place of bis(4,5,6,7-tetrahydroindenyl)hafnium dichloride. The results of polymerization and the physical properties of the product are respectively shown in Table 7 and Table 8.

Comparative Example 12

Manufacture of a preliminarily polymerized catalyst and evaluation of polymerization were performed in the same manner as in (1) and (2) in Example 11, except that 0.80 mmol of 1,2-ethylenebis(4,5,6,7-tetrahydroindenyl)hafnium dichloride was used as component [A1] and component [A2] was not used. The results of polymerization and the physical properties of the product are respectively shown in Table 7 and Table 8.

Explanation of Tables 1 and 2:

(1) Example 1, Example 2, Comparative Example 1 and Comparative Example 2 are a series of experiments using the same component [A1] and the same component [A2] and changing the ratio of component [A1] to component [A2], such as 1/0, 0.8/0.2, 0.5/0.5 and 0/1 respectively. In the case where component [A1] and component [A2] are used at the same time, high activity and high bulk density of a product can be ensured in gas phase polymerization without causing a problem of clogging of the discharge line of a reactor and stable running is realized rather than the case of using component [A1] or component [A2] alone.

(2) In Example 3, Example 4, Comparative Example 3 and Comparative Example 2, the same experiments as in (1) above were performed by changing the compound of component [A2]. In these experiments also, high activity and high bulk density of a product can be ensured without causing a problem of clogging of the discharge line of a reactor and stable running is realized in the case where component [A1] and component [A2] are used at the same time rather than the case of using component [A1] or component [A2] alone.

(3) Example 5, Comparative Example 4 and Comparative Example 5 are experiments of comparing the stable states in polymers by comparing the appearances of the ethylene/1-hexene copolymers obtained in the same manner as in (1) above. The film obtained by using component [A1] and component [A2] at the same time was less in fish eyes and superior to the films obtained by using component [A2] alone in appearance. This is due to the fact that the former is low in low active particles, free of the formation of low melting point particles, and the distribution of melting points among particles is narrow, so that molded products excellent in uniform composition can be stably manufactured. Further, in the case where component [A1] was used alone, stable manufacture was impossible and the amount of the sample necessary to film-forming could not be secured.

TABLE 1

| | Composition of Catalyst | | | | Results of Polymerization | | |
|---|---|---|---|---|---|---|---|
| | Component [A1] | | Component [A2] | | Component [B] | Feeding | |
| | Kind | μmol/g-[B] | Kind | μmol/g-[B] | Method of Treatment | Yield g/hr | Amount of Catalyst g-[B]/hr | Activity g-PE/g-[B] |
| Ex. 1 | Complex (1) | 120 | Complex (2) | 120 | Acid treatment and Ti salt treatment | 294 | 0.051 | 5,780 |
| Ex. 2 | " | 192 | " | 48 | Acid treatment and Ti salt treatment | 319 | 0.057 | 5,650 |
| Comp. Ex. 1 | None | 0 | " | 240 | Acid treatment and Ti salt treatment | 268 | 0.067 | 4,000 |
| Comp. Ex. 2 | Complex (1) | 240 | None | 0 | Acid treatment and Ti salt treatment | 283 | 0.076 | 3,740 |
| Ex. 3 | " | 120 | Complex (3) | 120 | Acid treatment and Ti salt treatment | 344 | 0.075 | 4,590 |
| Ex. 4 | " | 192 | " | 48 | Acid treatment and Ti salt treatment | 290 | 0.055 | 5,280 |
| Comp. Ex. 3 | None | 0 | " | 240 | Acid treatment and Ti salt treatment | 328 | 0.115 | 2,850 |
| Ex. 5 | Complex (1) | 120 | Complex (2) | 120 | Acid treatment | 313 | 0.037 | 8,360 |
| Comp. Ex. 4 | None | 0 | " | 240 | " | 256 | 0.055 | 4,680 |
| Comp. Ex. 5 | Complex (1) | 240 | None | 0 | " | 302 | 0.063 | 4,810 |

Complex (1): bis(n-butylcyclopentadienyl)hafnium dichloride

Complex (2): bis(1-n-butyl-3-methylcyclopentadienyl)zirconium dichloride

Complex (3): bis(1,3-dimethylcyclopentadienyl)zirconium dichloride

TABLE 2

| | Physical Properties of Products | | | | |
|---|---|---|---|---|---|
| | MI (g/10 min) | FR | Density (g/cm$^3$) | BD (g/cm$^3$) | FE (number/g) |
| Example 1 | 2.0 | 6.6 | 0.927 | 0.47 | — |
| Example 2 | 1.7 | 6.3 | 0.925 | 0.48 | — |
| Comparative Example 1 | 4.9 | 5.7 | 0.935 | 0.44 | — |
| Comparative Example 2 | 1.2 | 6.2 | 0.923 | 0.47 | — |
| Example 3 | 1.5 | 6.7 | 0.928 | 0.49 | — |
| Example 4 | 1.8 | 6.0 | 0.927 | 0.48 | — |
| Comparative Example 3 | 1.8 | 6.3 | 0.932 | 0.47 | — |
| Example 5 | 2.4 | 6.3 | 0.929 | 0.48 | 16.2 |
| Comparative Example 4 | 4.1 | 5.9 | 0.932 | 0.43 | 40.8 |
| Comparative Example 5 | 1.5 | 6.6 | 0.925 | 0.49 | — |

TABLE 3

| | Composition of Catalyst | | | | | Results of Polymerization | | |
|---|---|---|---|---|---|---|---|---|
| | Component [A1] | | Component [A2] | | Component [B] | Polymeri-zation | | Activity g-PE/ |
| | Kind | µmol/ g-[B] | Kind | µmol/ g-[B] | Method of Treatment | Yield g | Time hr | g-[B]/ hr |
| Ex. 6 | Complex (4) | 40 | Complex (5) | 40 | Acid treatment and Cr salt treatment | 218 | 0.53 | 4,090 |
| Comp. Ex. 6 | " | 80 | None | 0 | Acid treatment and Cr salt treatment | 196 | 0.70 | 2,800 |
| Comp. Ex. 7 | None | 0 | Complex (5) | 80 | Acid treatment and Cr salt treatment | 103 | 1.00 | 1,030 |

Complex (4): 1,2-ethylenebis(4,5,6,7-tetrahydroindenyl)zirconium dichloride
Complex (5): bis(cyclopentadienyl)zirconium dichloride

TABLE 4

| | Physical Properties of Products | | | |
|---|---|---|---|---|
| | MI (g/10 min) | FR | Density (g/cm$^3$) | BD (g/cm$^3$) |
| Example 6 | 1.9 | 7.4 | 0.922 | 0.40 |
| Comparative Example 6 | 1.6 | 7.6 | 0.921 | 0.38 |
| Comparative Example 7 | 1.5 | 7.9 | 0.926 | 0.38 |

Explanation of Tables 3 and 4:

Example 6, Comparative Example 6 and Comparative Example 7 are also a series of experiments using the same component [A1] and the same component [A2] and changing the ratio of component [A1] to component [A2], such as 1/0, 0.5/0.5 and 0/1 respectively. However, different compounds from the compounds used in the above examples and comparative examples are used as component [A1] and component [A2]. In the case where component [A1] and component [A2] are used at the same time, high activity and high bulk density of a product can be ensured in slurry polymerization and stable running is realized rather than the case of using component [A1] or component [A2] alone.

TABLE 5

| | Composition of Catalyst | | | | | Results of Polymerization | | |
|---|---|---|---|---|---|---|---|---|
| | Component [A1] | | Component [A2] | | Component [B] | | Feeding Amount of Catalyst | Activity |
| | Kind | µmol/ g-[B] | Kind | µmol/ g-[B] | Method of Treatment | Yield g/hr | g-[B]/hr | g-PE/ g-[B] |
| Ex. 7 | Complex (1) | 120 | Complex (2) | 120 | Acid treatment | 343 | 0.041 | 8,357 |
| Comp. Ex. 8 | None | 0 | " | 240 | " | 319 | 0.057 | 5,596 |
| Ex. 8 | Complex (1) | 120 | " | 120 | " | 312 | 0.023 | 13,300 |
| Ex. 9 | " | 120 | " | 120 | Acid treatment and Zn salt treatment | 248 | 0.015 | 16,700 |
| Ex. 10 | " | 120 | " | 120 | Acid treatment and Zn salt treatment | 180 | 0.016 | 11,100 |

Complex (1): bis(n-butylcyclopentadienyl)hafnium dichloride
Complex (2): bis(1-n-butyl-3-methylcyclopentadienyl)zirconium dichloride

TABLE 6

Physical Properties of Products

|  | MI (g/10 min) | FR | Density (g/cm³) | BD (g/cm³) | FE (number/g) |
|---|---|---|---|---|---|
| Example 7 | 1.2 | 6.7 | 0.924 | 0.42 | 15.9 |
| Comparative Example 8 | 1.4 | 6.1 | 0.924 | 0.38 | — |
| Example 8 | 1.5 | 6.1 | 0.914 | 0.38 | 10.2 |

TABLE 6-continued

Physical Properties of Products

|  | MI (g/10 min) | FR | Density (g/cm³) | BD (g/cm³) | FE (number/g) |
|---|---|---|---|---|---|
| Example 9 | 1.1 | 6.0 | 0.903 | 0.38 | — |
| Example 10 | 3.4 | 6.0 | 0.903 | 0.35 | — |

Explanation of Tables 5 and 6:
(1) Example 7 and Comparative Example 8 are experiments aiming at comparing the stabilities of polymerization when ethylene/1-hexene copolymers having almost the same MI and density are manufactured by gas phase polymerization with the same component [A1] and component [A2] as used in Example 5 and Comparative Example 4. In the case where component [A2] is used with component [A1] at the same time, high activity and high bulk density of a product can be ensured without causing a problem of clogging of the discharge line of a reactor and stable running is realized rather than the case of using component [A2] alone.
(2) Example 8, Example 9 and Example 10 are experiments aiming at discerning the range of stable running performance by performing the polymerization evaluation of the conditions for manufacturing lower density copolymers which are thought to be more difficult to be manufactured by stable running by using the catalyst manufactured by adopting the example in Example 5 which is a representative combination of component [A1], component [A2] and component [B]. As a result, it can be seen that low density copolymers which are difficult to manufacture when component [A1] or component [A2] is used alone can be manufactured conspicuously stably by the method of using component [A1] and component [A2] at the same time as in the present invention.

TABLE 7

| | Composition of Catalyst | | | | | Results of Polymerization | | |
|---|---|---|---|---|---|---|---|---|
| | Component [A1] | | Component [A2] | | Component [B] | Polymerization | | Activity g-PE/ |
| | Kind | μmol/ g-[B] | Kind | μmol/ g-[B] | Method of Treatment | Yield g | Time hr | g-[B]/ hr |
| Ex. 11 | Complex (7) | 40 | Complex (6) | 40 | Acid treatment and Cr salt treatment | 18.5 | 1.00 | 925 |
| Comp. Ex. 9 | " | 80 | None | 0 | Acid treatment and Cr salt treatment | 13.8 | ↓ | 690 |
| Comp. Ex. 10 | None | 0 | Complex (6) | 80 | Acid treatment and Cr salt treatment | 7.1 | ↓ | 355 |
| Ex. 12 | Complex (8) | 40 | " | 40 | Acid treatment and Cr salt treatment | 14.3 | ↓ | 715 |
| Comp. Ex. 11 | " | 80 | None | 0 | Acid treatment and Cr salt treatment | 11.6 | ↓ | 580 |
| Ex. 13 | Complex (9) | 40 | Complex (6) | 40 | Acid treatment and Cr salt treatment | 16.9 | ↓ | 845 |
| Comp. Ex. 12 | " | 80 | None | 0 | Acid treatment and Cr salt treatment | 13.1 | ↓ | 655 |

Complex (6): bis[2-methyl-(4,5,6,7-tetrahydroindenyl)]zirconium dichloride
Complex (7): bis(4,5,6,7-tetrahydroindenyl)hafnium dichloride
Complex (8): bis(1-n-butyl-3-methylcyclopentadienyl)hafnium dichloride
Complex (9): 1,2-ethylenebis(4,5,6,7-tetrahydroindenyl)hafnium dichloride

TABLE 8

Physical Properties of Products

|  | MI (g/10 min) | FR | Density (g/cm³) |
|---|---|---|---|
| Example 11 | 0.38 | 8.6 | 0.925 |
| Comparative Example 9 | 0.46 | 9.4 | 0.931 |
| Comparative Example 10 | 0.22 | 11.5 | 0.924 |
| Example 12 | 0.11 | 9.8 | 0.920 |
| Comparative Example 11 | Did not flow. | — | 0.918 |
| Example 13 | 0.14 | 9.2 | 0.917 |
| Comparative Example 12 | Did not flow. | | 0.915 |

Explanation of Tables 7 and 8:

A series of experiments of Example 11, Comparative Example 9 and Comparative Example 10, a series of experiments of Example 12, Comparative Example 11 and Comparative Example 10, and a series of experiments of Example 13, Comparative Example 12 and Comparative Example 10 are aiming at comparing polymerization performances in the case of using component [A1] or component [A2] alone and in the case of using component [A1] and component [A2] at the same time, wherein component [A2] is the same compound and component [A1] are different compounds. In any series of experiments, polymerizations show high activity and stable running is realized in the case where component [A1] and component [A2] are used simultaneously rather than the case of using component [A1] or component [A2] alone.

INDUSTRIAL APPLICABILITY

Since the catalyst in the present invention has high olefin polymerization activity, particles rapidly grow in a reactor, and fine particle troubles, e.g., agglomeration or adhesion can be reduced. In addition, fragmentation of particles does not occur, so that stable running of polymerization can be realized on an industrial scale for a long period of time. Further, particles of low activity are less and low melting point particles are not formed, so that the distribution of melting points among particles is narrow. As a result, it becomes possible to manufacture molded products excellent in uniform composition, and fine particle troubles, e.g., agglomeration or adhesion can be reduced, so that stable running of polymerization on an industrial scale for a long period of time can be realized. Further, molded products almost free of fish eyes and excellent in appearance can be manufactured with the olefins obtained by film-forming, blow molding or injection molding.

What is claimed is:

1. A method of polymerization of olefins, which comprises:
  copolymerizing ethylene and an α-olefin in the presence of a catalyst for olefin polymerization containing (A1) a hafnium compound or a zirconium compound having at least one conjugated 5-membered ring ligand, (A2) a zirconium compound having at least one conjugated 5-membered ring ligand having formula (5) below, but different from zirconium compound (A1),

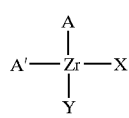

(5)

wherein, in formula (5), A and A', which are the same or different, each represents a ligand having a conjugated 5-membered ring structure, and X and Y, which are the same or different, each represents a hydrogen atom, a halogen atom, a hydrocarbon group, an alkoxy group, an amino group, a phosphorus-containing hydrocarbon group, or a silicon-containing hydrocarbon group, which are bonded to Zr, and
  (B) a phyllosilicate.

2. The method of polymerization of olefins as claimed in claim 1, wherein the α-olefin is 1-hexene.

3. The method of polymerization of olefins as claimed in claim 1, wherein the compound (A1) is a hafnium compound.

4. The method of polymerization of olefins as claimed in claim 1, wherein the compound (A1) is a metallocene compound represented by the following formula (1):

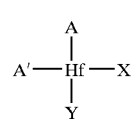

(1)

wherein, in formula (1), A and A', which are the same or different, each represents a ligand having a conjugated 5-membered ring structure, and X and Y, which are the same or different, each represents a hydrogen atom, a halogen atom, a hydrocarbon group, an alkoxyl group, an amino group, a phosphorus-containing hydrocarbon group or a silicon-containing hydrocarbon group, which are bonded to Hf.

5. The method of polymerization of olefins as claimed in claim 1, wherein the compound (A1) is a metallocene compound represented by the following formula (2):

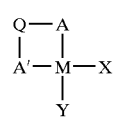

(2)

wherein, in formula (2), A and A', which are the same or different, each represents a ligand having a conjugated 5-membered ring structure, Q represents a linking group cross-linking two ligands having a conjugated 5-membered ring structure at arbitrary positions, M represents an Hf atom or a Zr atom, and X and Y, which are the same or different, each represents a hydrogen atom, a halogen atom, a hydrocarbon group, an alkoxy group, an amino group, a phosphorus-containing hydrocarbon group, or a silicon-containing hydrocarbon group, which are bonded to M.

6. The method of polymerization of olefins as claimed in claim 5, wherein A and A' in formula (1) or (2) in claim 18 or 19 each represents a cyclopentadienyl group having substituent(s) at the 1-position, the 3-position or both of these positions.

7. The method of polymerization of olefins as claimed in claim 1, wherein A and A' in formula (5) each represents a cyclopentadienyl group having substituents at the 1-position, the 3-position or both of these positions.

8. The method of polymerization of olefins as claimed in claim 1, wherein the (B) phyllosilicate belongs to a smectite group.

9. The method of polymerization of olefins as claimed in claim 1, wherein the catalyst for olefin polymerization is brought into contact with olefin in advance for the preliminary polymerization of the olefin in an amount ranging from 0.01 to 1,000 g per 1 g of the (B) phyllosilicate.

10. The method of polymerization of olefins as claimed in claim 1, wherein said alpha-olefin has from 3 to 20 carbon atoms.

11. The method of polymerization of olefins as claimed in claim 1, wherein the olefin polymer product obtained is an ethylene/alpha-olefin copolymer which has a density ranging from 0.890 to 0.930 g/cm$^3$ and an MI ranging from 0.1 to 20 g/10 minutes.

12. A catalyst for polymerization of olefins, comprising:
  (A1) a hafnium compound or a zirconium compound having at least one conjugated 5-membered ring ligand,
  (A2) a zirconium compound having at least one conjugated 5-membered ring ligand having formula (5) below, but different from zirconium compound (A1),

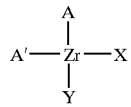 (5)

wherein, in formula (5), A and A', which are the same or different, each represents a ligand having a conjugated 5-membered ring structure, and X and Y, which are the same or different, each represents a hydrogen atom, a halogen atom, a hydrocarbon group, an alkoxy group, an amino group, a phosphorus-containing hydrocarbon group, or a silicon-containing hydrocarbon group, which are bonded to Zr, and (B) a phyllosilicate.

* * * * *